United States Patent
Chang et al.

(10) Patent No.: US 9,213,484 B2
(45) Date of Patent: Dec. 15, 2015

(54) METHOD FOR DETECTING SINGLE-FINGER ROTATE GESTURE AND THE GESTURE DETECTING CIRCUIT THEREOF

(75) Inventors: Hui-Hung Chang, Keelung (TW); Chun-Chieh Chang, Hsinchu (TW); Chih-Chang Lai, Hsinchu (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 91 days.

(21) Appl. No.: 13/314,505

(22) Filed: Dec. 8, 2011

(65) Prior Publication Data

US 2012/0146927 A1    Jun. 14, 2012

(30) Foreign Application Priority Data

Dec. 9, 2010    (TW) ................................ 99143113 A (51) Int. Cl.
 *G06F 3/041* (2006.01)
 *G06F 3/0488* (2013.01)

(52) U.S. Cl.
 CPC ........ *G06F 3/04886* (2013.01); *G06F 3/04883* (2013.01)

(58) Field of Classification Search
 USPC ......... 345/173, 174, 156, 157, 168, 163, 581, 345/660, 73; 382/228; 455/414.3, 466, 566; 700/3, 17; 715/255, 262, 700, 701, 715/702, 708, 716, 762, 765, 771, 772, 773, 715/777, 784, 792, 830, 835
 See application file for complete search history.

(56) References Cited

U.S. PATENT DOCUMENTS

| | | | | |
|---|---|---|---|---|
| 5,453,761 | A * | 9/1995 | Tanaka | 345/179 |
| 2008/0018615 | A1* | 1/2008 | Zadesky et al. | 345/173 |
| 2009/0289902 | A1* | 11/2009 | Carlvik et al. | 345/173 |
| 2010/0058251 | A1 | 3/2010 | Rottler et al. | |
| 2011/0205175 | A1* | 8/2011 | Chen | 345/173 |
| 2012/0056821 | A1* | 3/2012 | Goh | 345/173 |

FOREIGN PATENT DOCUMENTS

| | | |
|---|---|---|
| CN | 101097495 A | 1/2008 |
| CN | 101598970 A | 12/2009 |
| CN | 101667089 A | 3/2010 |
| TW | 200928897 A | 7/2009 |

* cited by examiner

*Primary Examiner* — Kathy Wang-Hurst
*Assistant Examiner* — Douglas Wilson
(74) *Attorney, Agent, or Firm* — Rabin & Berdo, P.C.

(57) ABSTRACT

A method for detecting a single-finger rotation gesture and a gesture detecting circuit thereof are provided. The gesture detecting circuit comprises a quadrant dividing unit, a register, a control unit, a comparing unit, and an outputting unit. The quadrant dividing unit, according to the center point, divides a touch panel into at least three quadrants and sets a plurality of data codes respectively corresponding to the quadrants. Within a predetermined time, the control unit controls the register to sequentially record the data codes respectively corresponding to the touched quadrants. When the predetermined time is reached, the comparing unit compares to judge whether the temporary data buffered in the register is the same with the default data. If the temporary data is the same with the default data, then the outputting unit outputs a rotation gesture signal.

13 Claims, 9 Drawing Sheets

METHOD FOR DETECTING SINGLE-FINGER ROTATE GESTURE AND THE GESTURE DETECTING CIRCUIT THEREOF

This application claims the benefit of Taiwan application Serial No. 99143113, filed Dec. 9, 2010, the subject matter of which is incorporated herein by reference.

BACKGROUND OF THE INVENTION

1. Field of the Invention

The invention relates in general to a touch panel, and more particularly to a method for detecting a single-finger rotation gesture for a touch panel and a gesture detecting circuit thereof.

2. Description of the Related Art

As the technology continuously advances, the interaction between the user and the system terminal is not limited to typing on the keyboard. The maturity in the touch technology enables the user to input through a touch panel and to operate the system terminal in a more natural and intuitive manner. For example, the frame can be enlarged/reduced by forming a clockwise rotation or an anti-clockwise rotation gesture on the touch panel. Therefore, how to correctly detect the rotation gesture on the touch panel has become an imminent task for the industries.

SUMMARY OF THE INVENTION

The invention is directed to a method for detecting a single-finger rotation gesture and a gesture detecting circuit thereof.

According to the present invention, a method for detecting a single-finger rotation gesture is provided. The method for detecting a single-finger rotation gesture comprises: According to a center point, a touch panel is divided into a plurality of quadrants and a plurality of data codes respectively corresponding to a plurality of quadrants are set, wherein the number of the quadrants is at least three. Within a predetermined time, a register is controlled to sequentially record the data codes respectively corresponding to the touched quadrants. When the predetermined time is reached, whether the temporary data buffered in the register is the same with the default data is judged through comparison. If the temporary data is the same with the default data, then a rotation gesture signal is outputted.

According to the present invention, a gesture detecting circuit is provided. The gesture detecting circuit comprises a quadrant dividing unit, a register, a control unit, a comparing unit, and an outputting unit. The quadrant dividing unit, according to a center point, divides a touch panel into a plurality of quadrants and sets a plurality of data codes respectively corresponding to a plurality of quadrants, wherein the number of the quadrants is at least three. Within a predetermined time, the control unit controls the register to sequentially record the data codes respectively corresponding to the touched quadrants. When the predetermined time is reached, the comparing unit compares to judge whether the temporary data buffered in the register is the same with the default data. The outputting unit outputs a rotation gesture signal if the temporary data is the same with the default data.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
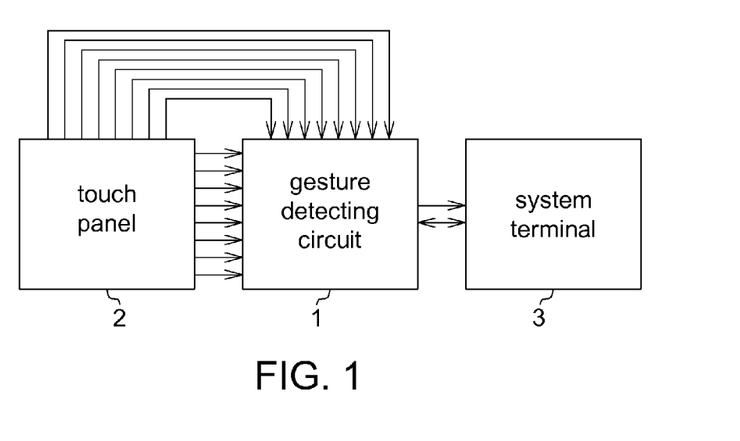
FIG. 1 shows a schematic diagram of a touch panel, a gesture detecting circuit and a system terminal.
Figure 2:
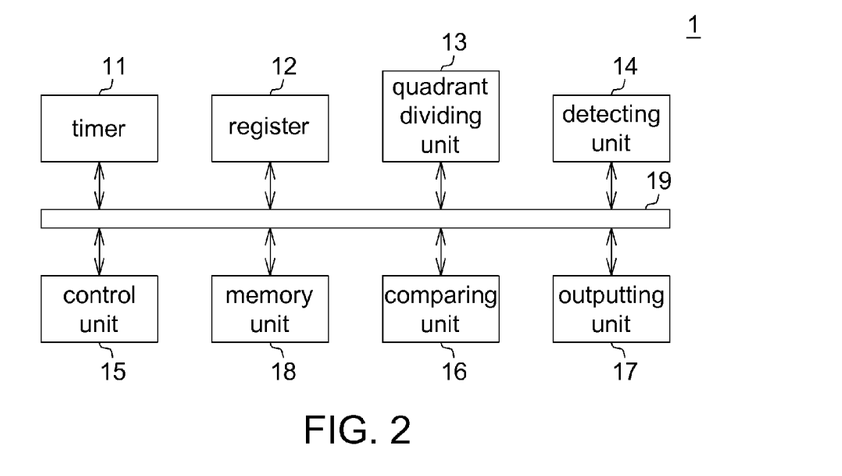
FIG. 2 shows a block diagram of a gesture detecting circuit according to a first embodiment.
Figure 3:
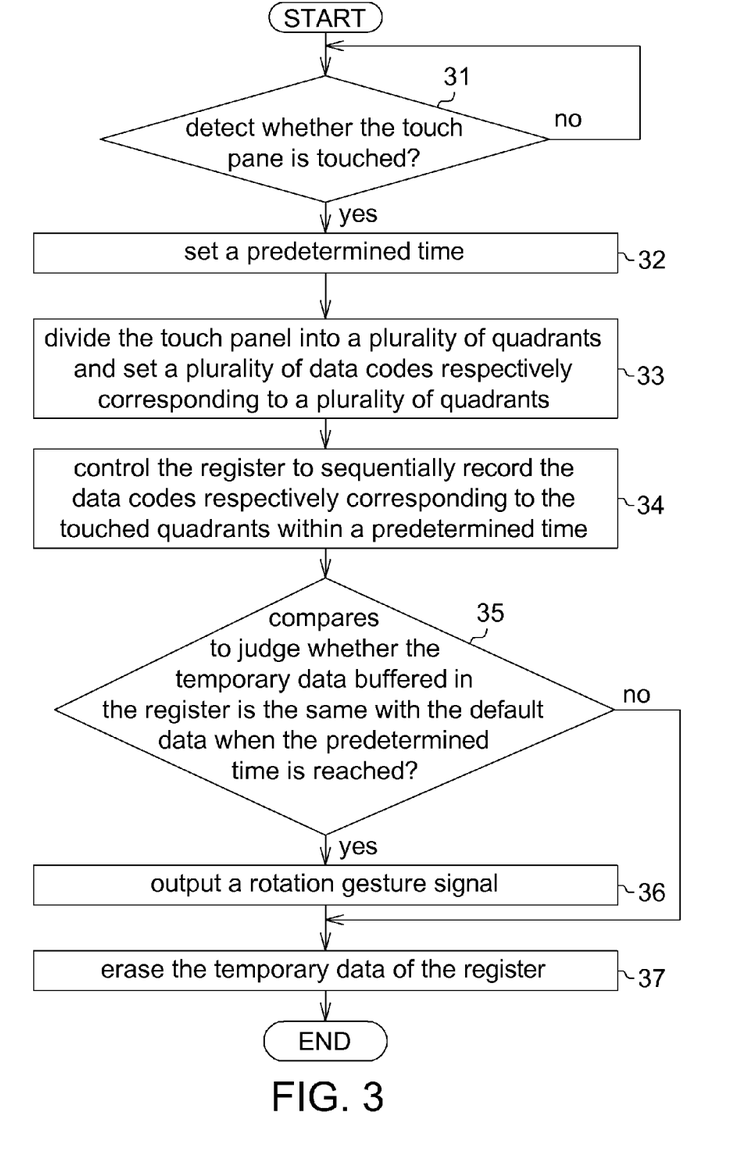
FIG. 3 shows a flowchart of a method for detecting a single-finger rotation gesture.

Referring to FIG. 1, FIG. 2 and FIG. 3. FIG. 1 shows a schematic diagram of a touch panel, a gesture detecting circuit and a system terminal. FIG. 2 shows a block diagram of a gesture detecting circuit according to a first embodiment. FIG. 3 shows a flowchart of a method for detecting a single-finger rotation gesture. The gesture detecting circuit 1 sequentially records the movement trace of a finger on a touch panel 2. The touch panel 2 can be realized by such as a capacitive type, a resistive type, an electromagnetic type, an optical type, a sound-wave type or an in-cell touch pane. When the movement trace of the finger on the touch panel 2 a rotation gesture, the gesture detecting circuit 1 outputs a rotation gesture signal to the system terminal 3.

The gesture detecting circuit 1 comprises a timer 11, the register 12, a quadrant dividing unit 13, a detecting unit 14, a control unit 15, a comparing unit 16, an outputting unit 17, a memory unit 18 and a bus 19. The timer 11, the register 12, the quadrant dividing unit 13, the detecting unit 14, the control unit 15, the comparing unit 16, the outputting unit 17 and the memory unit 18 are electrically connected to the bus 19. The timer 11 for counting a predetermined time can be realized by performing a program with a processor or by a hardware circuit. The memory unit 18 stores a default data such as a clockwise rotation data or an anti-clockwise rotation data. The quadrant dividing unit 13, the detecting unit 14 and the control unit 15 can be realized by a program performed by a processor or realized by a hardware circuit. The comparing unit 16 can be realized by a program performed by a processor or realized by a comparer. The outputting unit 17 can be realized by such as an inter-integrated circuit (I2C) interface, a serial peripheral interface bus (SPI), a universal asynchronous receiver/transmitter (UART) interface or a universal serial bus (USB) interface.

The method for detecting a single-finger rotation gesture can be used in the gesture detecting circuit 1 and comprises the following steps. Firstly, the method begins at step 31, whether the touch panel 2 is touched is detected by the detecting unit 14. If the touch panel 2 is not touched, then step 31 is repeated. To the contrary, if the touch panel 2 is touched, then step 32 is performed. Next, the method proceeds to step 32, a predetermined time is set by the control unit 15. Then, the method proceeds to step 33, the touch panel 2 is divided into a plurality of quadrants and a plurality of data codes respectively corresponding to a plurality of quadrants are set by the quadrant dividing unit 13 according to a center point, wherein the number of the quadrants is at least three, and the center point is such as a fixed type or a non-fixed type. Fixed type refers to the center point being fixed at the center of the touch panel 2 and does not vary with the touched position. To the contrary, the non-fixed type refers to the touched position being used as the center point.

Step 34 is performed after step 33 is completed. In step 34, within a predetermined time, the register 12 is controlled by the control unit 15 to sequentially record the data codes respectively corresponding to the touched quadrants. Then, the method proceeds to step 35, when the predetermined time is reached, whether the temporary data buffered in the register 12 is the same with the default data is judged by the comparing unit 16 through comparison. If the temporary data buffered in the register 12 is different from the default data, then step 37 is performed. In step 37, the temporary data of the register 12 is erased by the control unit 15. To the contrary, if the temporary data buffered in the register 12 is the same with the default data, then step 36 is performed. In step 36, a rotation gesture signal is outputted by the outputting unit 17. Then, the method proceeds to step 37, the temporary data of the register 12 is erased by the control unit 15.

Figure 4:
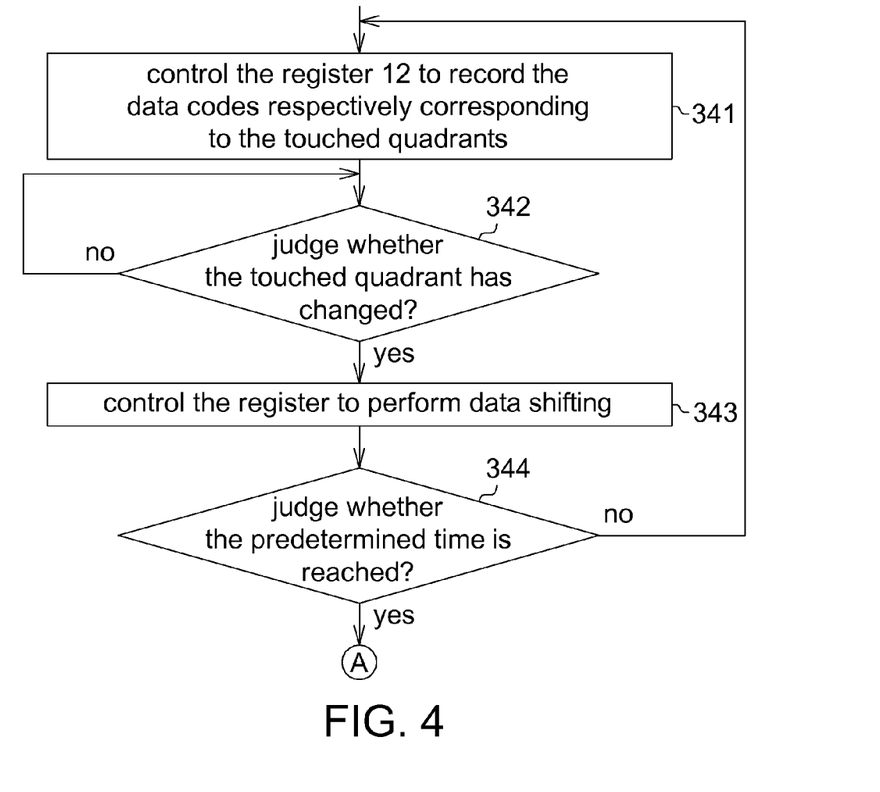
FIG. 4 shows detailed procedures of step 34.

Referring to FIG. 2 and FIG. 4. FIG. 4 shows detailed procedures of step 34. Step 34 further comprises steps 341~344, wherein step 341 is performed after step 33 is completed. In step 341, the register 12 is controlled by the control unit 15 to record the data codes respectively corresponding to the touched quadrants. Then, the method proceeds to step 342, whether the touched quadrant has changed is judged. If the touched quadrant has not changed, then step 342 is repeated. If the touched quadrant has changed, then step 343 is performed. In step 343, the register 12 is controlled by the control unit 15 to perform data shifting such as left rotation or right rotation. Then, the method proceeds to step 344, whether the predetermined time is reached is judged by the control unit 15. If the predetermined time is reached, then step 35 is performed, whether the temporary data buffered in the register 12 is the same with the default data is judged by the comparing unit 16 through comparison. To the contrary, if the predetermined time is not reached, then step 341 is performed again, and the register 12 is controlled by the control unit 15 to record the data codes respectively corresponding to the touched quadrants.

Figure 5:
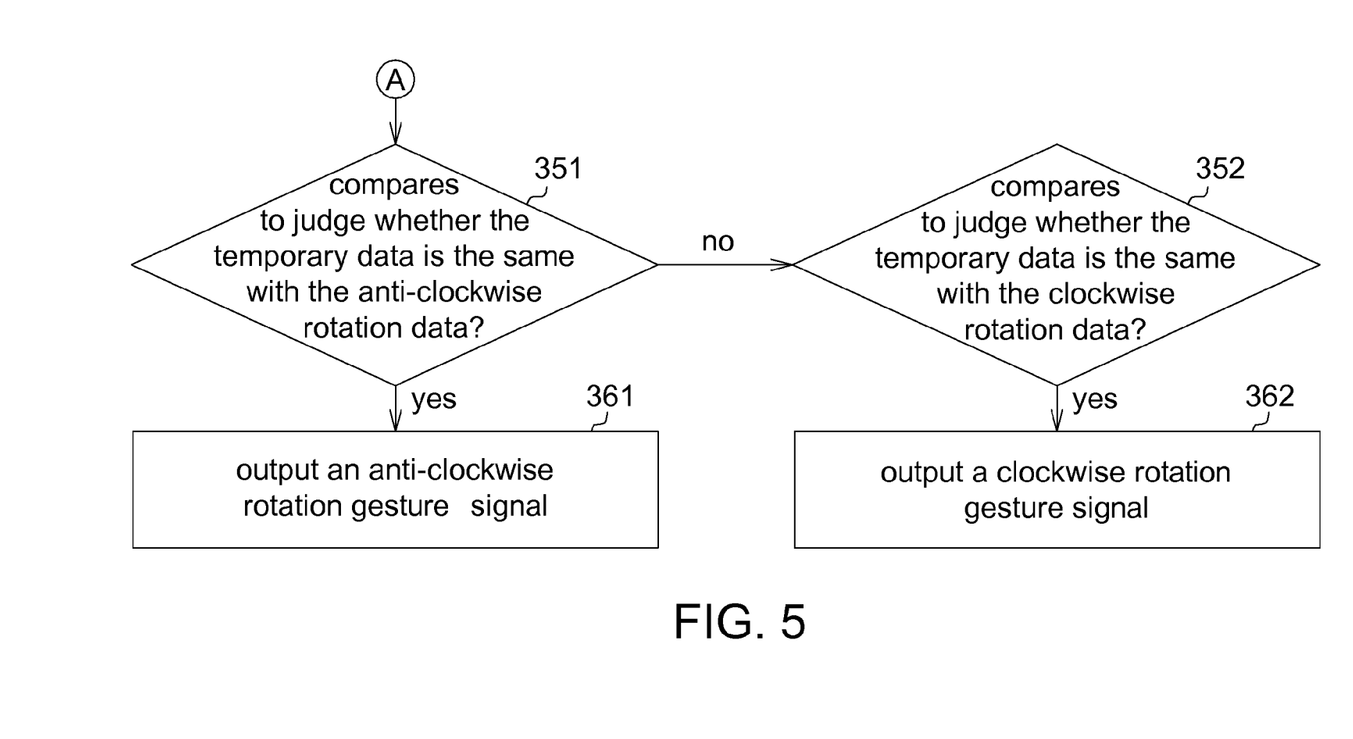
FIG. 5 shows detailed procedures of step 35 and 36.

Referring to both FIG. 2 and FIG. 5. FIG. 5 shows detailed procedures of step 35 and 36. Step 35 further comprises step 351 and 352, and step 36 further comprises steps 361 and 362. Step 351 is performed after step 34 is completed. In step 351, whether the temporary data is the same with the anti-clockwise rotation data is judged by the comparing unit 16 through comparison.

Figure 6:
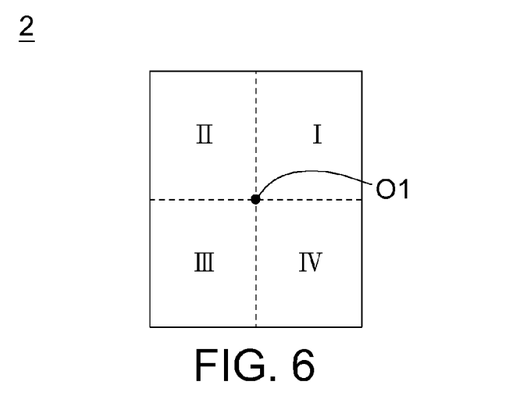
FIG. 6 shows a schematic diagram of dividing a touch panel into four quadrants according to the center of the touch panel.

Referring to FIG. 6, a schematic diagram of dividing a touch panel into four quadrants according to the center of the touch panel is shown. For example, in the first embodiment, the center point is fixed and is the center O1 of the touch panel 2, according to the center O1 of the touch panel 2, the touch panel 2 is divided into a first quadrant I, a second quadrant II, a third quadrant III and a fourth quadrant IV by the quadrant dividing unit 13 so that the first quadrant I, the second quadrant II, the third quadrant III and the fourth quadrant IV have the same area. The data codes $(11)_2$, $(10)_2$, $(01)_2$ and $(00)_2$ respectively corresponding to the first quadrant I, the second quadrant II, the third quadrant III and the fourth quadrant IV are set by the quadrant dividing unit 13.

Figure 7:
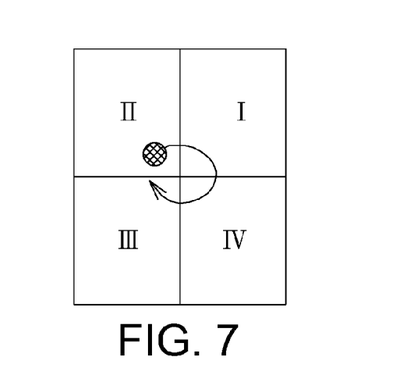
FIG. 7 shows a schematic diagram of forming a clockwise rotation gesture on a touch panel according to a first embodiment.

Referring to FIG. 7, a schematic diagram of forming a clockwise rotation gesture on a touch panel according to a first embodiment is shown. For convenience of elaboration, the following disclosure is exemplified by the formation of a clockwise rotation gesture on a touch panel. Firstly, when the detecting unit 14 detects that the finger touches the touch panel, the data code $(10)_2$ corresponding to the currently touched second quadrant II are recorded in the bit [7:6] of the register 12.

Then, when the finger from the second quadrant II drags to the first quadrant I, the detecting unit 14 detects that the touched quadrant has changed. The control unit 15 controls the register 12 to rotate the data code $(10)_2$ rightward to the bit [5:4] of the register 12, and judges whether the predetermined time is reached. If the predetermined time is not reached, then the control unit 15 records the data code $(11)_2$ corresponding to the first quadrant I in the bit [7:6] of the register 12.

Following that, when the finger drags to the fourth quadrant IV from the first quadrant I, the detecting unit 14 detects that the touched quadrant has changed. The control unit 15 controls the register 12 to rotate the data code $(10)_2$ rightward to the bit [3:2] of the register 12 and rotate the data code $(11)_2$ rightward to the bit [5:4] of the register 12, and judges whether the predetermined time is reached. If the predetermined time is not reached, then the control unit 15 records the data code $(00)_2$ corresponding to the fourth quadrant IV in the bit [7:6] of the register 12.

Afterwards, when the finger drags to the third quadrant III from the fourth quadrant IV, the detecting unit 14 detects that the touched quadrant has changed. The control unit 15 controls the register 12 to rotate the data code $(10)_2$ rightward to the bit [1:0] of the register 12, rotate the data code $(11)_2$ rightward to the bit [3:2] of the register 12 and rotate the data code $(00)_2$ rightward to the bit [5:4] of the register 12, and judges whether the predetermined time is reached. If the predetermined time is not reached, then the control unit 15 records the data code $(01)_2$ corresponding to the third quadrant III in the bit [7:6] of the register 12.

Then, after the predetermined time is reached, the comparing unit 16 compares to judge whether the temporary data of the register 12 $(01001110)_2$ is the same with one of the four default data, namely, the clockwise rotation data $(E4)_{16}$, the clockwise rotation data $(39)_{16}$, the clockwise rotation data $(4E)_{16}$ and the clockwise rotation data $(93)_{16}$. The comparing unit 16 compares to judge whether the temporary data $(01001110)_2$ is the same with the clockwise rotation data $(4E)_{16}$. If the temporary data $(01001110)_2$ is the same with the clockwise rotation data $(4E)_{16}$, then the comparing unit outputs a clockwise rotation gesture signal.

Figure 8:
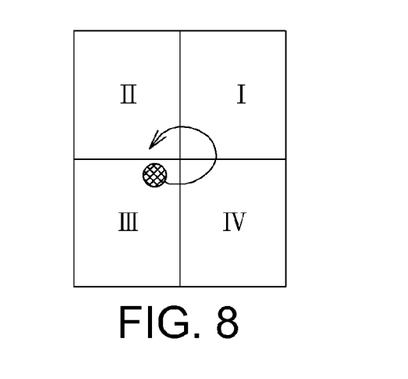
FIG. 8 shows a schematic diagram of forming an anti-clockwise rotation gesture on a touch panel according to a first embodiment.

Referring to FIG. 8, a schematic diagram of forming an anti-clockwise rotation gesture on a touch panel according to a first embodiment is shown. For convenience of elaboration, the following disclosure is exemplified by the formation of an anti-clockwise rotation gesture on a touch panel. Firstly, when the detecting unit 14 detects that the finger touches the touch panel, the data code $(01)_2$ corresponding to the currently touched third quadrant III is recorded in the bit [7:6] of the register 12.

Then, when the finger drags to the fourth quadrant IV from the third quadrant III, the detecting unit 14 detects that the touched quadrant has changed. The control unit 15 controls the register 12 to rotate the data code $(01)_2$ rightward to the bit [5:4] of the register 12, and judges whether the predetermined time is reached. If the predetermined time is not reached, then the control unit 15 records the data code $(00)_2$ corresponding to the fourth quadrant IV in the bit [7:6] of the register 12.

Following that, when the finger drags to the first quadrant I from the fourth quadrant IV, the detecting unit 14 detects that the touched quadrant has changed. The control unit 15 controls the register 12 to rotate the data code $(01)_2$ rightward to the bit [3:2] of the register 12 and rotate the data code $(00)_2$ rightward to the bit [5:4] of the register 12, and judges whether the predetermined time is reached. If the predetermined time is not reached, then the control unit 15 records the data code $(11)_2$ corresponding to the first quadrant I in the bit [7:6] of the register 12.

Afterwards, when the finger from the first quadrant I drags to the second quadrant II, the detecting unit 14 detects that the touched quadrant has changed. The control unit 15 controls the register 12 to rotate the data code $(01)_2$ rightward to the bit [1:0] of the register 12, rotate the data code $(00)_2$ rightward to the bit [3:2] of the register 12 and rotate the data code $(11)_2$ rightward to the bit [5:4] of the register 12, and judges whether the predetermined time is reached. If the predetermined time is not reached, then the control unit 15 records the data code $(10)_2$ corresponding to the second quadrant II in the bit [7:6] of the register 12.

Then, after the predetermined time is reached, the comparing unit 16 compares to judge whether the temporary data of the register 12 $(10110001)_2$ is the same with one of the four default data, namely, the anti-clockwise rotation data $(1B)_{16}$, the anti-clockwise rotation data $(C6)_{16}$, the anti-clockwise rotation data $(B1)_{16}$ and the anti-clockwise rotation data $(6C)_{16}$. The comparing unit 16 compares to judge whether the temporary data $(10110001)_2$ is the same with the anti-clockwise rotation data $(B1)_{16}$. If the temporary data $(10110001)_2$ is the same with the anti-clockwise rotation data $(B1)_{16}$, then the comparing unit outputs an anti-clockwise rotation gesture signal.

Second Embodiment

Figure 9:
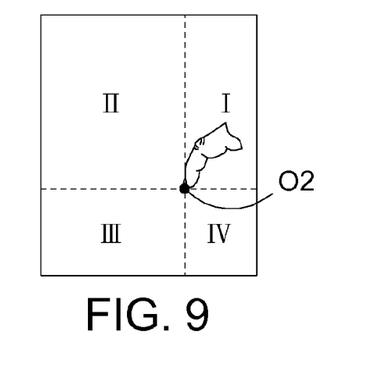
FIG. 9 shows a schematic diagram of dividing a touch panel into four quadrants according to a touched position on the touch panel.

Referring to FIG. 9, a schematic diagram of dividing a touch panel into four quadrants according to a touched position on the touch panel is shown. For example, in the second embodiment, the center point is not fixed and is a touched position on the touch panel 2, the quadrant dividing unit 13, according to a touched position O2 on the touch panel 2, divides the touch panel 2 into a first quadrant I, a second quadrant II, a third quadrant III and a fourth quadrant IV. The quadrant dividing unit 13 sets the data codes $(11)_2$, $(10)_2$, $(01)_2$ and $(00)_2$ respectively corresponding to the first quadrant I, the second quadrant II, the third quadrant III and the fourth quadrant IV.

Figure 10:
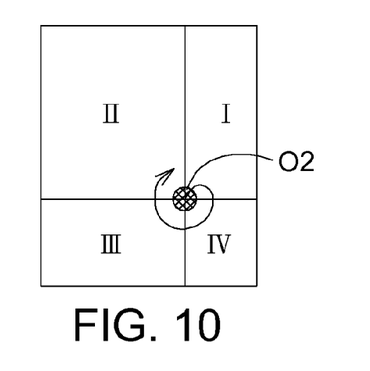
FIG. 10 shows a schematic diagram of forming a clockwise rotation gesture on a touch panel according to a second embodiment.

Referring to FIG. 10, a schematic diagram of forming a clockwise rotation gesture on a touch panel according to a second embodiment is shown. For convenience of elaboration, the following disclosure is exemplified by the formation of a clockwise rotation gesture on a touch panel. Firstly, when the detecting unit 14 detects that the finger touches the touch panel, the quadrant dividing unit 13, according to a touched position being used as the center point, divides the touch panel 2 into a first quadrant I, a second quadrant II, a third quadrant III and a fourth quadrant IV and sets the data codes $(11)_2$, $(10)_2$, $(01)_2$ and $(00)_2$ respectively corresponding to the first quadrant I, the second quadrant II, the third quadrant III and the fourth quadrant IV.

When the finger drags to the first quadrant I from the touched position O2, the control unit 15 records the data code $(11)_2$ corresponding to the currently touched first quadrant I in the bit [7:6] of the register 12.

Then, when the finger drags to the fourth quadrant IV from the first quadrant I, the detecting unit 14 detects that the touched quadrant has changed. The control unit 15 controls the register 12 to rotate the data code $(11)_2$ rightward to the bit [5:4] of the register 12, and judges whether the predetermined time is reached. If the predetermined time is not reached, then the control unit 15 records the data code $(00)_2$ corresponding to the fourth quadrant IV in the bit [7:6] of the register 12.

Following that, when the finger drags to the third quadrant III from the fourth quadrant IV, the detecting unit 14 detects that the touched quadrant has changed. The control unit 15 controls the register 12 to rotate the data code $(11)_2$ rightward to the bit [3:2] of the register 12 and rotate the data code $(00)_2$ rightward to the bit [5:4] of the register 12, and judges whether the predetermined time is reached. If the predetermined time is not reached, then the control unit 15 records the data code $(01)_2$ corresponding to the third quadrant III in the bit [7:6] of the register 12.

Afterwards, when the finger drags to the second quadrant II from the third quadrant III, the detecting unit 14 detects that the touched quadrant has changed. The control unit 15 controls the register 12 to rotate the data code $(11)_2$ rightward to the bit [1:0] of the register 12, rotate the data code $(00)_2$ rightward to the bit [3:2] of the register 12 and rotate the data code $(01)_2$ rightward to the bit [5:4] of the register 12, and judges whether the predetermined time is reached. If the predetermined time is not reached, then the control unit 15 records the data code $(10)_2$ corresponding to the second quadrant II in the bit [7:6] of the register 12.

Then, after the predetermined time is reached, the comparing unit 16 compares to judge whether the temporary data of the register 12 $(10010011)_2$ is the same with one of the four default data, namely, the clockwise rotation data $(E4)_{16}$, the clockwise rotation data $(39)_{16}$, the clockwise rotation data $(4E)_{16}$ and the clockwise rotation data $(93)_{16}$. The comparing unit 16 compares to judge whether the temporary data $(01001110)_2$ is the same with the clockwise rotation data $(93)_{16}$. If the temporary data $(01001110)_2$ is the same with the clockwise rotation data $(93)_{16}$, then the comparing unit outputs a clockwise rotation gesture signal.

Figure 11:
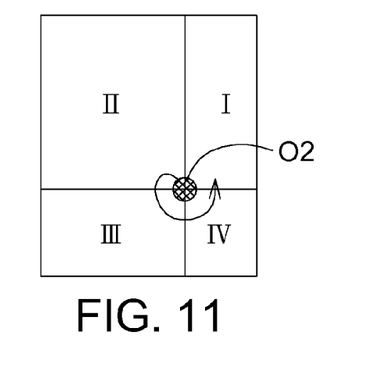
FIG. 11 shows a schematic diagram of forming an anti-clockwise rotation gesture on a touch panel according to a second embodiment.

Referring to FIG. 11, a schematic diagram of forming an anti-clockwise rotation gesture on a touch panel according to a second embodiment is shown. For convenience of elaboration, the following disclosure is exemplified by the formation of an anti-clockwise rotation gesture on a touch panel. Firstly, when the detecting unit 14 detects that the finger touches the touch panel, the quadrant dividing unit 13, according to a touched position being used as the center point, divides the touch panel 2 into a first quadrant I, a second quadrant II, a third quadrant III and a fourth quadrant IV and sets the data codes $(11)_2$, $(10)_2$, $(01)_2$ and $(00)_2$ respectively corresponding to the first quadrant I, the second quadrant II, the third quadrant III and the fourth quadrant IV.

When the finger drags to the second quadrant II from the touched position O2, the control unit 15 records the data code $(10)_2$ corresponding to the currently touched second quadrant II in the bit [7:6] of the register 12.

Then, when the finger drags to the third quadrant III from the second quadrant II, the detecting unit 14 detects that the touched quadrant has changed. The control unit 15 controls the register 12 to rotate the data code $(10)_2$ rightward to the bit [5:4] of the register 12, and judges whether the predetermined time is reached. If the predetermined time is not reached, then the control unit 15 records the data code $(01)_2$ corresponding to the third quadrant III in the bit [7:6] of the register 12.

Following that, when the finger drags to the fourth quadrant IV from the third quadrant III, the detecting unit 14 detects that the touched quadrant has changed. The control unit 15 controls the register 12 to rotate the data code $(10)_2$ rightward to the bit [3:2] of the register 12 and rotate the data code $(01)_2$ rightward to the bit [5:4] of the register 12, and judges whether the predetermined time is reached. If the predetermined time is not reached, then the control unit 15 records the data code $(00)_2$ corresponding to the fourth quadrant IV in the bit [7:6] of the register 12.

Afterwards, when the finger from the fourth quadrant IV drags to the first quadrant I, the detecting unit 14 detects that the touched quadrant has changed. The control unit 15 controls the register 12 to rotate the data code $(10)_2$ rightward to the bit [1:0] of the register 12, rotate the data code $(01)_2$ rightward to the bit [3:2] of the register 12 and rightward rotate the data code $(00)_2$ to the bit [5:4] of the register 12, and judges whether the predetermined time is reached. If the predetermined time is not reached, then the control unit 15 records the data code $(11)_2$ corresponding to the first quadrant I in the bit [7:6] of the register 12.

Then, after the predetermined time is reached, the comparing unit 16 compares to judge whether the temporary data of the register 12 $(11000110)_2$ is the same with one of the four default data, namely, the anti-clockwise rotation data $(1B)_{16}$, the anti-clockwise rotation data $(C6)_{16}$, the anti-clockwise rotation data $(B1)_{16}$ and the anti-clockwise rotation data $(6C)_{16}$. The comparing unit 16 compares to judge whether the temporary data $(11000110)_2$ is the same with the anti-clockwise rotation data $(C6)_{16}$. If the temporary data $(11000110)_2$ is the same with the anti-clockwise rotation data $(C6)_{16}$, then the comparing unit outputs an anti-clockwise rotation gesture signal.

Third Embodiment

Figure 12:
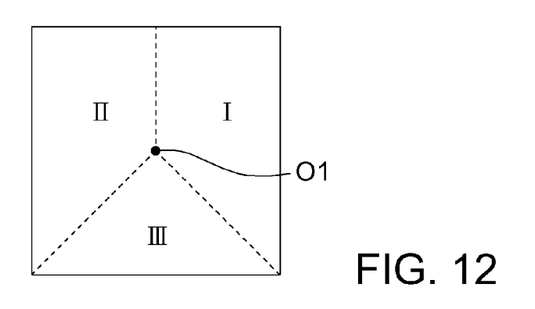
FIG. 12 shows a schematic diagram of dividing a touch panel into three quadrants according to the center of the touch panel.

Referring to FIG. 12, a schematic diagram of dividing a touch panel into three quadrants according to the center of the touch panel is shown. For example, in the first embodiment, the center point is fixed and is the center O1 of the touch panel 2, and the quadrant dividing unit 13, according to the center point O1 of the touch panel 2, divides the touch panel 2 into a first quadrant I, a second quadrant II and a third quadrant III so that the first quadrant I, the second quadrant II and the third quadrant III have the same area. The quadrant dividing unit 13 sets the data codes $(11)_2$, $(10)_2$ and $(01)_2$ respectively corresponding to the first quadrant I, the second quadrant II and the third quadrant III.

Figure 13:
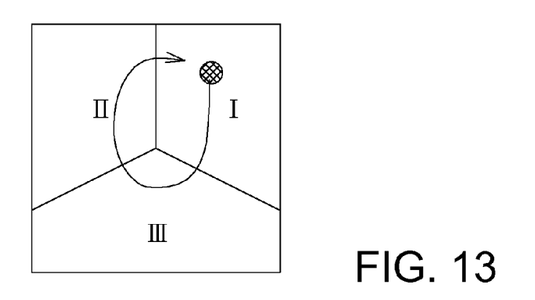
FIG. 13 shows a schematic diagram of forming a clockwise rotation gesture on a touch panel according to a third embodiment.

Referring to FIG. 13, a schematic diagram of forming a clockwise rotation gesture on a touch panel according to a third embodiment is shown. For convenience of elaboration, the following disclosure is exemplified by the formation of a clockwise rotation gesture on a touch panel. Firstly, when the detecting unit 14 detects that the finger touches the touch panel, the data code $(11)_2$ corresponding to the currently touched first quadrant I is recorded in the bit [7:6] of the register 12.

Then, when the finger drags to the third quadrant III from the first quadrant I, the detecting unit 14 detects that the touched quadrant has changed. The control unit 15 controls the register 12 to rotate the data code $(11)_2$ rightward to the bit [5:4] of the register 12, and judges whether the predetermined time is reached. If the predetermined time is not reached, then the control unit 15 records the data code $(01)_2$ corresponding to the third quadrant III in the bit [7:6] of the register 12.

Following that, when the finger drags to the second quadrant II from the third quadrant III, the detecting unit 14 detects that the touched quadrant has changed. The control unit 15 controls the register 12 to rotate the data code $(11)_2$ rightward to the bit [3:2] of the register 12 and rotate the data code $(01)_2$ rightward to the bit [5:4] of the register 12, and judges whether the predetermined time is reached. If the predetermined time is not reached, then the control unit 15 records the data code $(10)_2$ corresponding to the second quadrant II in the bit [7:6] of the register 12.

Afterwards, when the finger drags to the first quadrant I from the second quadrant II, the detecting unit 14 detects that the touched quadrant has changed. The control unit 15 controls the register 12 to rotate the data code $(11)_2$ rightward to the bit [1:0] of the register 12, rotate the data code $(01)_2$ rightward to the bit [3:2] of the register 12 and rightward rotate the data code $(10)_2$ to the bit [5:4] of the register 12, and judges whether the predetermined time is reached. If the predetermined time is not reached, then the control unit 15 records the data code $(11)_2$ corresponding to the first quadrant I in the bit [7:6] of the register 12.

Then, when the predetermined time is reached, the comparing unit 16 compares to judge whether the temporary data of the register 12 $(11100111)_2$ is the same with one of the three default data, namely, the clockwise rotation data $(79)_{16}$, the clockwise rotation data $(9E)_{16}$, and the clockwise rotation data $(E7)_{16}$. The comparing unit 16 compares to judge whether the temporary data $(11100111)_2$ is the same with the clockwise rotation data $(E7)_{16}$. If the temporary data $(11100111)_2$ is the same with the clockwise rotation data $(E7)_{16}$, then the comparing unit outputs a clockwise rotation gesture signal.

Figure 14:
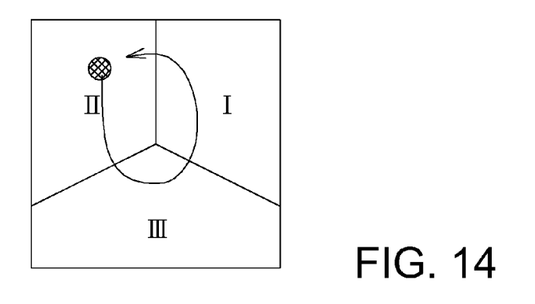
FIG. 14 shows a schematic diagram of forming an anti-clockwise rotation gesture on a touch panel according to a third embodiment.

Referring to FIG. 14, a schematic diagram of forming an anti-clockwise rotation gesture on a touch panel according to a third embodiment is shown. For convenience of elaboration, the following disclosure is exemplified by the formation of an anti-clockwise rotation gesture on a touch panel. Firstly, when the detecting unit 14 detects that the finger touches the touch panel, the data codes $(10)_2$ corresponding to the currently touched second quadrant II is recorded in the bit [7:6] of the register 12.

Then, when the finger drags to the third quadrant III from the second quadrant II, the detecting unit 14 detects that the touched quadrant has changed. The control unit 15 controls the register 12 to rotate the data code $(10)_2$ rightward to the bit [5:4] of the register 12, and judges whether the predetermined time is reached. If the predetermined time is not reached, then the control unit 15 records the data code $(01)_2$ corresponding to the third quadrant III in the bit [7:6] of the register 12.

Following that, when the finger drags to the first quadrant I from the third quadrant III, the detecting unit 14 detects that the touched quadrant has changed. The control unit 15 controls the register 12 to rotate the data code $(10)_2$ rightward to the bit [3:2] of the register 12 and rotate the data code $(01)_2$ rightward to the bit [5:4] of the register 12, and judges whether the predetermined time is reached. If the predetermined time is not reached, then the control unit 15 records the data code $(11)_2$ corresponding to the first quadrant I in the bit [7:6] of the register 12.

Afterwards, when the finger drags to the second quadrant II from the first quadrant I, the detecting unit 14 detects that the touched quadrant has changed. The control unit 15 controls the register 12 to rightward rotate the data code $(10)_2$ to the bit [1:0] of the register 12 and rotate the data code $(01)_2$ rightward to the bit [3:2] of the register 12 and rotate the data code $(11)_2$ rightward to the bit [5:4] of the register 12, and judges whether the predetermined time is reached. If the predetermined time is not reached, then the control unit 15 records the data code $(10)_2$ corresponding to the second quadrant II in the bit [7:6] of the register 12.

Then, after the predetermined time is reached, the comparing unit 16 compares to judge whether the temporary data of the register 12 $(10110110)_2$ is the same with one of the three default data, namely, the anti-clockwise rotation data $(DB)_{16}$, the anti-clockwise rotation data $(B6)_{16}$ and the anti-clockwise rotation data $(6D)_{16}$. The comparing unit 16 compares to judge whether the temporary data $(10110001)_2$ is the same with the anti-clockwise rotation data $(B6)_{16}$. If the temporary data $(10110001)_2$ is the same with the anti-clockwise rotation data $(B6)_{16}$, then the comparing unit outputs an anti-clockwise rotation gesture signal.

Fourth Embodiment

Figure 15:
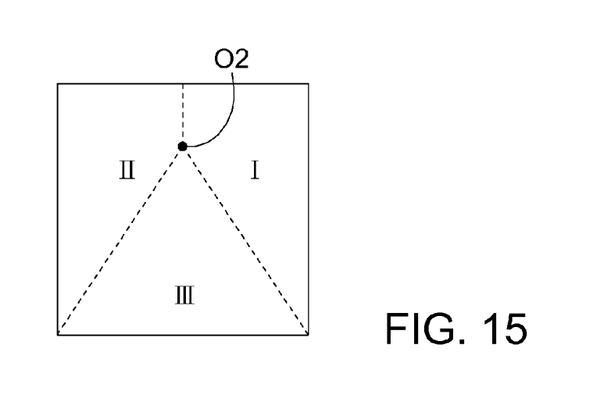
FIG. 15 shows a schematic diagram of dividing a touch panel into three quadrants according to a touched position on the touch panel.

Referring to FIG. 15, a schematic diagram of dividing a touch panel into three quadrants according to a touched position on the touch panel is shown. For example, in the fourth embodiment, the center point is not fixed and is a touched position on the touch panel 2, and the quadrant dividing unit 13, according to a touched position O2 on the touch panel 2, divides the touch panel 2 into a first quadrant I, a second quadrant II and a third quadrant III. The quadrant dividing unit 13 sets the data codes $(11)_2$, $(10)_2$ and $(01)_2$ respectively corresponding to the first quadrant I, the second quadrant II and the third quadrant III.

Figure 16:
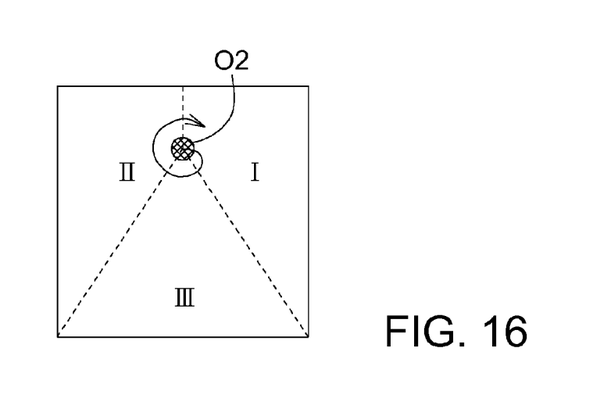
FIG. 16 shows a schematic diagram of forming a clockwise rotation gesture on a touch panel according to a fourth embodiment.

Referring to FIG. 16, a schematic diagram of forming a clockwise rotation gesture on a touch panel according to a fourth embodiment is shown. For convenience of elaboration, the following disclosure is exemplified by the formation of a clockwise rotation gesture on a touch panel. Firstly, when the detecting unit 14 detects that the finger touches the touch panel, the quadrant dividing unit 13, according to a touched position being used as the center point, divides the touch panel 2 into a first quadrant I, a second quadrant II and a third quadrant III and sets the data codes $(11)_2$, $(10)_2$ and $(01)_2$ respectively corresponding to the first quadrant I, the second quadrant II and the third quadrant III.

When the finger drags to the first quadrant I from the touched position O2, the control unit 15 records the data code $(11)_2$ corresponding to the currently touched first quadrant I in the bit [7:6] of the register 12.

Then, when the finger drags to the third quadrant III from the first quadrant I, the detecting unit 14 detects that the touched quadrant has changed. The control unit 15 controls the register 12 to rightward rotate the data code $(11)_2$ to the bit [5:4] of the register 12, and judges whether the predetermined time is reached. If the predetermined time is not reached, then the control unit 15 records the data code $(01)_2$ corresponding to the third quadrant III in the bit [7:6] of the register 12.

Following that, when the finger drags to the second quadrant II from the third quadrant III, the detecting unit 14 detects that the touched quadrant has changed. The control unit 15 controls the register 12 to rotate the data code $(11)_2$ rightward to the bit [3:2] of the register 12 and rotate the data code $(01)_2$ rightward to the bit [5:4] of the register 12, and judges whether the predetermined time is reached. If the predetermined time is not reached, then the control unit 15 records the data code $(01)_2$ corresponding to the second quadrant II in the bit [7:6] of the register 12.

Afterwards, when the finger drags to the first quadrant I from the second quadrant II, the detecting unit 14 detects that the touched quadrant has changed. The control unit 15 controls the register 12 to rotate the data code $(11)_2$ rightward to the bit [1:0] of the register 12, rotate the data code $(01)_2$ rightward to the bit [3:2] of the register 12 and rightward rotate the data code $(10)_2$ to the bit [5:4] of the register 12 and judges whether the predetermined time is reached. If the predetermined time is not reached, then the control unit 15 records the data code $(11)_2$ corresponding to the first quadrant I in the bit [7:6] of the register 12.

Then, after the predetermined time is reached, the comparing unit 16 compares to judge whether the temporary data of the register 12 $(11100111)_2$ is the same with one of the three default data, namely, the clockwise rotation data $(79)_{16}$, the clockwise rotation data $(9E)_{16}$ and the clockwise rotation data $(E7)_{16}$. The comparing unit 16 compares to judge whether the temporary data $(11100111)_2$ is the same with the clockwise rotation data $(E7)_{16}$. If the temporary data $(11100111)_2$ is the same with the clockwise rotation data $(E7)_{16}$, then the comparing unit outputs a clockwise rotation gesture signal.

Figure 17:
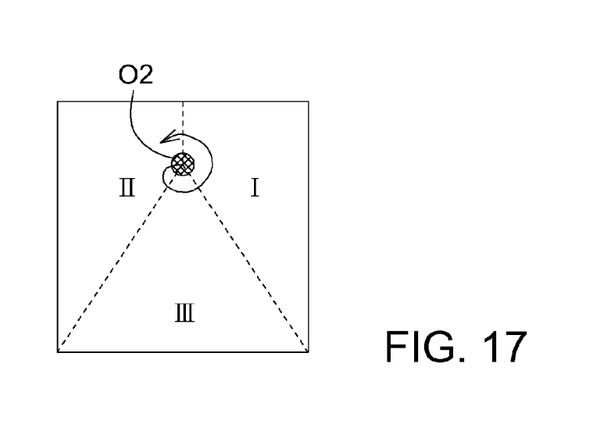
FIG. 17 shows a schematic diagram of forming an anti-clockwise rotation gesture on a touch panel according to a fourth embodiment.

Referring to FIG. 17, a schematic diagram of forming an anti-clockwise rotation gesture on a touch panel according to a fourth embodiment is shown. For convenience of elaboration, the following disclosure is exemplified by the formation of an anti-clockwise rotation gesture on a touch panel. Firstly, when the detecting unit 14 detects that the finger touches the touch panel, the quadrant dividing unit 13, according to a touched position being used as the center point, divides the touch panel 2 into a first quadrant I, a second quadrant II and a third quadrant III and sets the data codes $(11)_2$, the data codes $(10)_2$ and the data codes $(01)_2$ respectively corresponding to the first quadrant I, the second quadrant II and the third quadrant III.

When the finger drags to the second quadrant II from the touched position O2, the control unit 15 records the data code $(10)_2$ corresponding to the currently touched second quadrant II in the bit [7:6] of the register 12.

Then, when the finger drags to the third quadrant III from the second quadrant II, the detecting unit 14 detects that the touched quadrant has changed. The control unit 15 controls the register 12 to rotate the data code $(10)_2$ rightward to the bit [5:4] of the register 12, and judges whether the predetermined time is reached. If the predetermined time is not reached, then the control unit 15 records the data code $(01)_2$ corresponding to the third quadrant III in the bit [7:6] of the register 12.

Following that, when the finger drags to the first quadrant I from the third quadrant III, the detecting unit 14 detects that the touched quadrant has changed. The control unit 15 controls the register 12 to rotate the data code $(10)_2$ rightward to the bit [3:2] of the register 12 and rotate the data code $(01)_2$ rightward to the bit [5:4] of the register 12, and judges whether the predetermined time is reached. If the predetermined time is not reached, then the control unit 15 records the data code $(11)_2$ corresponding to the first quadrant I in the bit [7:6] of the register 12.

Afterwards, when the finger drags to the second quadrant II from the first quadrant I, the detecting unit 14 detects that the touched quadrant has changed. The control unit 15 controls the register 12 to rotate the data code $(10)_2$ rightward to the bit [1:0] of the register 12, rotate the data code $(01)_2$ rightward to the bit [3:2] of the register 12 and rotate the data code $(11)_2$ rightward to the bit [5:4] of the register 12, and judges whether the predetermined time is reached. If the predetermined time is not reached, then the control unit 15 records the data code $(10)_2$ corresponding to the second quadrant II in the bit [7:6] of the register 12.

Then, after the predetermined time is reached, the comparing unit 16 compares to judge whether the temporary data of the register 12 $(10110110)_2$ with one of the three default data, namely, the anti-clockwise rotation data $(DB)_{16}$, the anti-clockwise rotation data $(B6)_{16}$ and the anti-clockwise rotation data $(6D)_{16}$. The comparing unit 16 compares to judge whether the temporary data $(10110110)_2$ is the same with the anti-clockwise rotation data $(B6)_{16}$. If the temporary data $(10110110)_2$ is the same with the anti-clockwise rotation data $(B6)_{16}$, then the comparing unit outputs an anti-clockwise rotation gesture signal.

Figure 18:
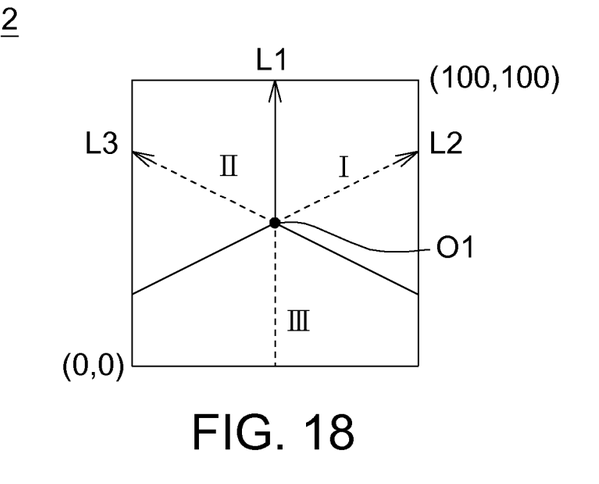
FIG. 18 shows a schematic diagram of dividing three quadrants with three straight lines.

Referring to FIG. 18, a schematic diagram of dividing three quadrants with three straight lines is shown. The procedures for dividing the touch panel 2 into three quadrants are disclosed below. Firstly, let the coordinate of the original point at the bottom left corner of the touch panel 2 be (0,0), and the coordinate of the maximum point at the top right corner of the touch panel 2 be (100,100), and the coordinate of the center point O1 of the touch panel 2 be (50,50). The equations of the straight lines L1~L3 illustrated in FIG. 18 respectively are the straight line L1: x=50, the straight line L2: y=a2x+b2, and the straight line L3: y=a3x+b3.

According to the theories of mathematical inequality linear programming, the first quadrant I, which must satisfy the rightward half of the straight line L1 and the upper half of the straight line L3, can be mathematically expressed as: x>50 and a3x+b3>0. When x>50 and a3x+b3>0 both hold true, the touched position is located in the first quadrant I of the touch panel 2.

Similarly, the second quadrant II, which must satisfy the leftward half of the straight line L1 and the upper half of the straight line L2, can be mathematically expressed as: x<50 and a2x+b2>0. When x<50 and a2x+b2>0 both hold true, the touched position is located in the second quadrant II of the touch panel 2.

Similarly, the third quadrant III, which must satisfy the lower half of the straight line L2 and the lower half of the straight line L3, can be mathematically expressed as: a2x+b2<0 and a3x+b3<0. When a2x+b2<0 and a3x+b3<0 both hold true, the touched position is located in the third quadrant III of the touch panel 2.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for detecting a single-finger rotation gesture, wherein the method comprises:
   dividing a touch panel into at least three area segments separated by straight lines extending outwardly from a center point and setting a plurality of data codes respectively corresponding to each area segment among the at least three area segments, wherein each of the at least three area segments is permanently fixed to a particular area of the touch panel;
   detecting which one of the at least three area segments is touched;
   controlling a register to sequentially record the data codes respectively corresponding to the touched area segments within a predetermined time;
   comparing to judge whether temporary data buffered in the register is the same as predetermined default data when the predetermined time is reached; and
   outputting a rotation gesture signal if the temporary data is the same as the default data.

2. The method for detecting a single-finger rotation gesture according to claim 1, wherein the controlling step comprises:
   controlling the register to record the data codes respectively corresponding to the touched area segments;
   judging whether a touched area segment among the at least three area segments has changed to another of the area segments;
   controlling the register to perform data shifting;
   judging whether the predetermined time is reached: if the predetermined time is not reached, then the step of controlling the register to record the data codes respectively corresponding to the touched area segments is repeated; and
   if the predetermined time is reached, then the comparison step is performed.

3. The method for detecting a single-finger rotation gesture according to claim 1, wherein the default data comprises anti-clockwise rotation data and clockwise rotation data, and the comparison step comprises:
   comparing to judge whether the temporary data is the same as the anti-clockwise rotation data; and
   comparing to judge whether the temporary data is the same as the clockwise rotation data if the temporary data is different from the anti-clockwise rotation data.

4. The method for detecting a single-finger rotation gesture according to claim 3, wherein the rotation gesture signal comprises an anti-clockwise rotation gesture signal and a clockwise rotation gesture signal, and the outputting step comprises:
   outputting the anti-clockwise rotation gesture signal if the temporary data is the same as the anti-clockwise rotation data; and
   outputting the clockwise rotation gesture signal if the temporary data is the same as the clockwise rotation data.

5. The method for detecting a single-finger rotation gesture according to claim 1, wherein the center point is fixed and is the center of the touch panel so that the area of each area segment is the same.

6. A gesture detecting circuit, comprising:
   a segment dividing unit for dividing a touch panel into at least three area segments separated by straight lines extending outwardly from a center point and setting a plurality of data codes respectively corresponding to each area segment among said at least three area segments, wherein each of the at least three area segments is permanently fixed to a particular area of the touch panel;

a register;

a detecting unit for detecting which one of the at least three area segments is touched;

a control unit for controlling the register to sequentially record the data codes respectively corresponding to the touched area segments within a predetermined time;

a comparing unit for comparing to judge whether temporary data buffered in the register is the same as predetermined default data when the predetermined time is reached; and an outputting unit for outputting a rotation gesture signal if the temporary data is the same as the default data.

7. The gesture detecting circuit according to claim 6, wherein the detecting unit detects whether the touch panel is touched.

8. The gesture detecting circuit according to claim 7, wherein the detecting unit judges whether a touched area segment among the area segments has changed to another of the area segments, the control unit controls the register to perform data shifting after the touched area segment has changed, and the control unit controls the register to record the data codes respectively corresponding to the touched area segments if the predetermined time is not reached.

9. The gesture detecting circuit according to claim 6, wherein the default data comprises anti-clockwise rotation data and clockwise rotation data, the comparing unit compares to judge whether the temporary data is the same as the anti-clockwise rotation data, and then compares to judge whether the temporary data is the same as the clockwise rotation data if the temporary data is different from the anti-clockwise rotation data.

10. The gesture detecting circuit according to claim 9, wherein the rotation gesture signal comprises an anti-clockwise rotation gesture signal and a clockwise rotation gesture signal, and the outputting unit outputs the anti-clockwise rotation gesture signal if the temporary data is the same as the anti-clockwise rotation data and outputs the clockwise rotation gesture signal if the temporary data is the same as the clockwise rotation data.

11. The gesture detecting circuit according to claim 6, wherein the center point is fixed and is the center of the touch panel so that the area of each area segment is the same.

12. A method for detecting a single-finger rotation gesture, wherein the method comprises the steps of:
   (A) dividing a touch panel into at least three area segments separated by straight lines extending outwardly from a reference point;
   (B) assigning a plurality of data codes to the area segments, each data code being assigned to a respective one of the area segments;
   (C) detecting when a first one of the area segments has been touched, and storing the data code assigned to the first one of the area segments in a register;
   (D) detecting when a next one of the area segments has been touched, and sequentially storing the data code assigned to the next one of the area segments in the register, the detection in step (D) being conducted without regard to the previous area segment that was touched;
   (E) repeating step (D) until a predetermined number of data codes have been sequentially stored in the registered within a predetermined period of time;
   (F) comparing this sequence stored in the register at the conclusion of step (E) with a set of predetermined default data;
   (G) outputting a rotation gesture signal if the sequence stored in the register matches any of the predetermined default data.

13. The method according to claim 12, wherein the reference point is a first position on the touch panel that is touched during the single-finger rotation gesture.

* * * * *